United States Patent [19]
Desbois et al.

[11] 3,962,673
[45] June 8, 1976

[54] SYSTEM FOR READING ACOUSTIC IMAGES

[75] Inventors: Jean Desbois; Pierre Tournois, both of Paris, France

[73] Assignee: Thomson-CSF, Paris, France

[22] Filed: Oct. 29, 1974

[21] Appl. No.: 518,987

[30] Foreign Application Priority Data
Oct. 31, 1973 France .............................. 73.38912

[52] U.S. Cl. .............................. 340/15; 340/5 MP; 310/8.1; 333/72
[51] Int. Cl.² ...................................... H04B 11/00
[58] Field of Search ...... 340/5 MP; 73/67.7, 67.8 S, 73/67.9; 310/8.1

[56] References Cited
UNITED STATES PATENTS

| | | | |
|---|---|---|---|
| 3,090,030 | 5/1963 | Schuck ............................ | 73/67.8 S |
| 3,731,214 | 5/1973 | Bers .................................. | 333/30 R |
| 3,794,964 | 2/1974 | Katakura ......................... | 340/5 MP |
| 3,875,550 | 4/1975 | Quate et al. ..................... | 340/5 MP |

Primary Examiner—Maynard R. Wilbur
Assistant Examiner—T. M. Blum
Attorney, Agent, or Firm—Oblon, Fisher, Spivak, McClelland & Maier

[57] ABSTRACT

A system is provided for reading acoustic images such as those obtainable in an elastic medium as a result of the focusing of, or interference between, acoustic waves. The image analysing device comprises a substrate made of piezoelectric material which is provided on one face with an interdigital array and an electro-acoustic transducer.

The system permits to read acoustic images formed at the free surface on the opposite face of the substrate or at a certain distance from its free surface in contact with an elastic propagation medium.

6 Claims, 7 Drawing Figures a b

SYSTEM FOR READING ACOUSTIC IMAGES

BACKGROUND OF THE INVENTION

The present invention relates to systems for reading acoustic images such as those which are obtained in an elastic medium as a result of focusing or interference of elastic ultrasonic waves and which are converted into an electrical signal.

Known devices for reading any type of two-dimensional image generally proceed by decomposing this image into a predetermined number of constituent parts, termed "points," which are defined in terms of illumination or luminance. For an acoustic image, a group of discrete electro-acoustic transducers quantitatively corresponding to the exact number of image points being analyzed, enables to transduce the acoustic field distribution into electrical signal levels.

The electrical signals produced in this way may then be processed with a view to transmitting them sequentially to some remote point or imaging them on a display device.

The optical analogue of such a system of analysis is termed a mosaic.

DESCRIPTION OF PRIORT ART

Certain systems for analyzing an acoustic image find it advantageous to scan in successive lines, which can be achieved by means of a time-multiplexed system which scans the individual transducers corresponding to the image points.

However, this method requires the material presence along any one line of image points of as many discrete transducers as there are image points, which particularly complicates a receiver embodiment comprising such a transducer assembly when a high-definition scanning of an acoustic image is involved.

The system according to the invention uses an image-analyzer device which allows a linear acoustic image, i.e., a distribution of acoustic energy in a single dimension, to be read, this distribution normally being termed illumination or luminance $I(x)$, $x$ representing a reference axis in the dimension in question.

When it is desired to use the analyser device according to the invention to read a two-dimensional acoustic image $I(x,y)$ which has the same resolution in both dimensions and which may be decomposed into $N^2$ points for example, only N devices according to the invention will be needed rather than the $N^2$ discrete transducers necessary for analysis by the "mosaic" technique.

By adding a scanning means, it becomes possible for a single analyzer device according to the invention to read sequentially a group of lines forming a two dimensional acoustic image.

This analyser device relies on the non-linear characteristics of the material from which the device is formed relative to the second order interactions between mechanical stress patterns which are cyclic in time and space and which may be generated in a piezoelectric medium by means of certain types of excitation.

It is known to use such types of non-linear interaction to convert the spacial distribution of acoustic energy of surface waves into a signal extending over time. These waves consist in compressional or shear vibratory disturbances which involve only a shallow layer of the material close to its free surface.

Such a system is described in, for example, the article by Ash and Mason which appeared in "Electronic Letters," August 9 1973, volume 9, No. 16.

Nevertheless it is difficult to use the system described to read a linear acoustic energy density which results from the propagation of acoustic waves in a medium the mass of which is in contact with the reading system. This is achieved by means of a conversion from bulk waves to surface waves, which is usually difficult to bring about.

SUMMARY OF THE INVENTION

The device according to the invention enables on the other hand a distribution of acoustic energy which is propagated in bulk waves and which has a physical existence on the receiving surface of the device to be read directly, or again it enables a distribution of energy which is located at a workable distance from the device to be read.

In accordance with a feature of the present invention, depending upon the excitation signals used and the selection of the excitation electrodes of the analyser device, it becomes possible to read an acoustic image formed on the surface of the device or at a distance from its receiving surface, this distance extending continuously to infinity.

In accordance with another feature, the invention provides a system for reading acoustic images propagated in an elastic medium, comprising:

a surface acoustic wave analyzer device for processing an incident signal by interaction with an excitation signal and for producing a resulting output signal convenient for imaging; a signal generator means for supplying said excitation signal having short pulses with a pulsation $\alpha_p$ kept at a first constant periodicity; and output display means for imaging; said analyzer comprising a piezoelectric medium substrate having one face to meet said elastic medium for receiving incident acoustic bulk waves signal propagated at a second constant periodicity pulsation $\alpha_s$ and forming on said receiving face an acoustic image defined by a linear acoustic energy density, and further provided on the opposite face with at least one electro-acoustic transducer means, connectable to said output analyzer means, and at least one interdigital array means of a given length (L) successively arranged on said substrate opposite face perpendicularly to the direction of propagation of a launched elastic surface wave and connectable to said generator means, and wherein said incident $\alpha_s$ and excitation $\alpha_p$ signals, simultaneously applied to said array, each respectively generate a pattern of mechanical surface strains and the non linear interaction thus produced by the two said patterns gives rise to acoustic surface waves with resulting signal pulsation due to addition or difference of the superimposed pulsations ($\alpha_p \pm \alpha_s$), the duration (T) of said resulting signal ($\alpha_p \pm \alpha_s$) being equal to the ratio of said array length (L) to the propagation velocity (C) of the surface waves over the said substrate, and the acoustic image being derived from the electrical signal supplied by said transducer means to said output display means with a filtering around its constant pulsation ($\alpha_p \pm \alpha_s$).

BRIEF DESCRIPTION OF THE DRAWINGS

Other features of the present invention will become apparent from the following description which is given by way of example and from the drawings which relate to it.

DETAILED DESCRIPTION OF THE PREFERRED EMBODIMENTS

The views in the figures are to an arbitrary scale and the members are greatly enlarged to assist understanding and to make the drawings clearer.

Figure 1:
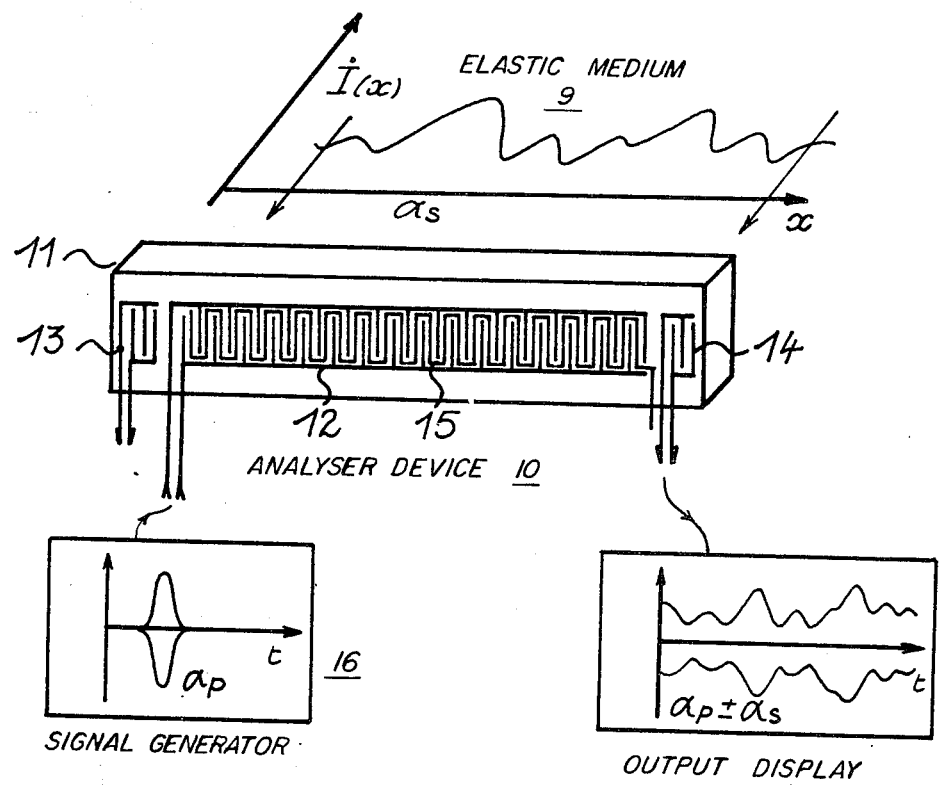
FIG. 1 shows a perspective view of the analyzer device and includes as a help to understanding, an illustration of the form of the acoustic and electrical signals where it is a case of the reading of acoustic images formed on the surface of the device in the system according to the invention.

The analyzer device 10 in FIG. 1 is made up of a substrate 11 of piezoelectric material on one free surface of which is formed a linear acoustic image produced by an incident flux of acoustic energy propagated in an elastic medium 9, which image is characterised by a spacial energy density I (x), of carrier pulsation $\alpha_s$, shown at the top of FIG. 1.

An interdigital array 12 and electro-acoustic transducers 13, 14, which may be formed by interdigital combs, are arranged on another surface on the opposite side of the material 11; the combs 13 and 14 enclose the array 12 and are relatively smaller than those forming the array 12.

The main axis of the device is defined by a straight line which passes through its center and is perpendicular to the surface on which the acoustic image is formed. The incident acoustic energy I (x) sets up in the piezoelectric medium a pattern of mechanical stresses whose common pulsation is $\alpha_s$ and whose intensity depends on x. The incident pulsation will be termed $\alpha_s$. This stress pattern exists at the surface occupied by the interdigital array 12.

The interdigital array 12 is capable of being excited at specific times by a high energy electrical pulse of short duration. The carrier pulsation of the pulse is $\alpha_p$ and this is termed the pump pulsation and is shown in the box at the lower left of FIG. 1. which corresponds to a signal generators means 16.

This pulse launches over the whole area of the piezoelectric medium 11 which is occupied by the interdigital array 12 a pattern of surface stresses the non-linear interaction of which with the stress pattern due to the incident energy I (x) causes acoustic surface waves to be generated the pulsation of which results from the sum or difference of pulsations $\alpha_s$ and $\alpha_p$ which waves, under certain conditions, are able to be propagated longitudinally towards comb 14 or comb 13 and are converted by the combs into an electrical signal such as that shown in the box at the bottom right of FIG. 1. which corresponds to the output analyser means.

The conditions under which the surface wave in question is propagated are as follows:

the spacial periodicity p of the interdigital array 12 is such that:

$$\frac{2\pi}{p} = \frac{\alpha_p \pm \alpha_s}{C}$$

where C is the velocity of propagation of the acoustic surface wave over the pizeoelectric material 11;

the resulting pulsation $\alpha_p \pm \alpha_s$ is sufficiently different from pulsations $\alpha_s$ and $\alpha_p$ to prevent any other waves which may constitute interference being propagated on the surface of materiel 11;

the interdigital array 12 is so arranged as to prevent the attenuation of the resulting surface waves by the so-called "stop band" effect. As an example a continuous electrode or "meander" 15 may be used. This electrode is arranged between the opposing comb members forming array 12 and its potential may be left floating, or may be equal to earth potential. The presence of electrode 15 divides by two the recurrence frequency of comb 12 when the electrode performs a passive function after the pump pulse of pulsation $\alpha_p$ has been applied.

This being so, the resulting electrical signals supplied by the interdigital combs 13 or 14 is an electrical signal representing an image of the surface wave produced, the pulsation of which is $\alpha_p \pm \alpha_s$, which surface wave is itself an image in time of the distribution of energy I (x). It is enough to filter the frequency band of the electrical signal received at the output around the sum or difference frequency to be left with only a single operating mode.

What is read by the device 10 is effectively the whole of the linear image I (x) as a result of the space/time transposition brought about as a result of the propagation of the surface wave and the conversion of this surface wave into an electrical signal by means of one of the interdigital combs 13 or 14.

The spacial recurrence frequency of combs 13 and 14 is coherent with the filtering selected, the analyzer device being produced for the operating mode adopted.

With this type of operation, the signal termed the pump signal, which is of pulsation $\alpha_p$, and the incident signal, which is of pulsation $\alpha_s$, cannot give rise to surface waves which are propagated over the piezoelectric material 11.

Figure 2:
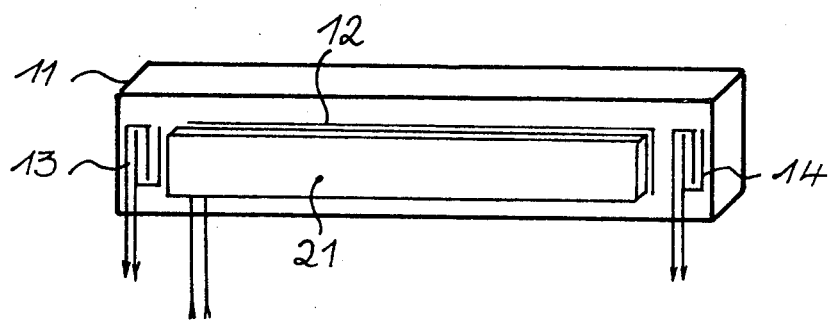
FIGS. 2a, 2b show other embodiments of the device according to the invention.
Figure 2:
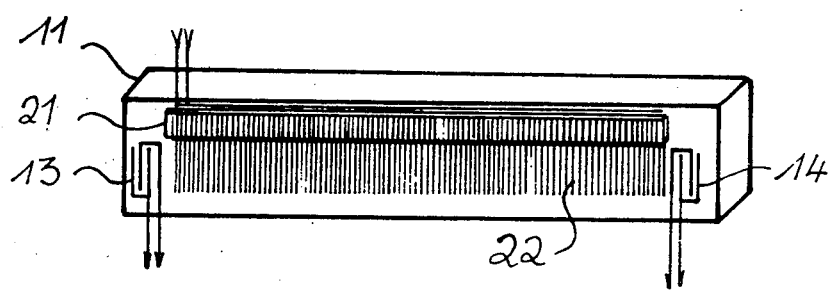
Figure 2:
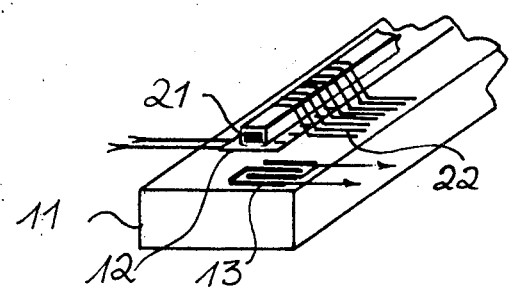

FIG. 2a shows another embodiment of the device according to the invention. It is formed by arranging a semiconductor member 21 above the interdigital array 12, the two being separated by a thin dielectric film, of air for example. The electrical non-linearity effects of semiconductor 21 predominate over the piezoelectric non-linearity effects of material 11.

In a preferred embodiment, the piezoelectric material 11 used may be, e.g., lithium niobate, Li Nb O$_3$, and the semiconductor member 21 used, e.g., silicium, Si, or Gallium arsenide, GaAs. Such materials are used in a structure as described by G. S. KINO and al. in I.E.E.E. Transactions, Vol. MTT-21, No. 4, April 1973, on pages 244–254.

FIG. 2b shows another embodiment in which the semiconductor substance 21 covers part of the interdigital array 12, the combination being located away from the path of the acoustic waves along the surface of material 11. These waves interact with members 12 and 21 via a digital comb 22 the recurrence frequency of which is very low in comparison with that of array 12 and which is formed from mutually isolated conductive strips. The perspective view shows an analyzer device produced in this way.

In addition, the use as shown in FIG. 1 of a substrate which is made of a substance which is a piezoelectric semiconductor constitutes a third embodiment of a device according to the invention.

Figure 3:
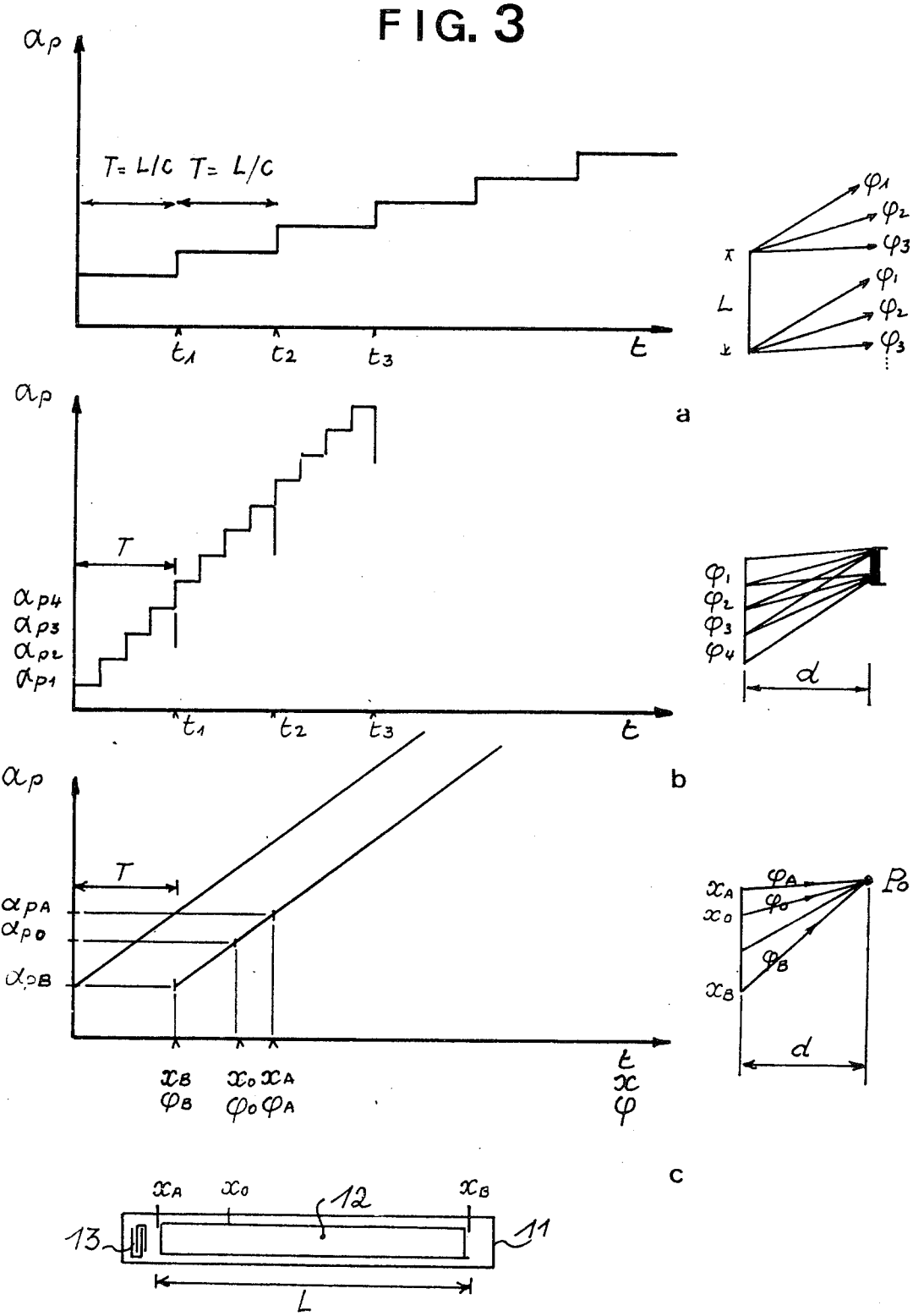
FIG. 3a, 3b and 3c show explanatory diagrams relating to the use of the device for reading acoustic images formed at a distance from the device.

The diagrams of FIG. 3 illustrate the way in which the device 10 in the system described operates when used with the object of reading an acoustic image formed at a distance from it, the functions of the interdigital combs 13 and 14 on the one hand and array 12 on the other being now inverted.

FIG. 3a is a time/pulsation graph of a staircase signal which supplies one of the combs 13 or 14 in FIG. 1. This signal is formed by a cyclic voltage of pulsation $\alpha_p$ which varies in successive steps of increasing pulsation and constant duration $T = L/C$, where $L$ is the overall useful length of array 12 and $C$ is the velocity of propagation of the surface waves which are generated by combs 13 or 14. In what follows it will be assumed that only comb 13 is being used, the surface wave being propagated from comb 13 to array 12.

As the end of a period $T=L/C$, the whole useful area of the piezoelectric medium 11 is physically occupied by the acoustic surface wave of pulsation $\alpha_p$ which is excited by the interdigital comb 13. However, the function of the excitation of constant pulsation $\alpha_p$ is to induce at the surface of the piezoelectric medium 11 an electrical field state having the same spacial recurrence frequency as that of array 12 when the number of waves $Ki$ resulting from the non-linear interaction of the incident acoustic energy of pulsation $\alpha_s$ with the pump signal of pulsation $\alpha_p$ is equal to $\pm (2\pi/p)$ where $p$ is the spacial recurrence frequency of interdigital array 12.

This number of waves $Ki$ is given by the relationship $$Ki = Kp \pm Ks \sin \phi$$

in which:
$Kp$ is the number of waves of the pump signal, $$kp = \frac{\alpha p}{C}$$

$C$ is the velocity of propagation of the surface waves, $Ks$ is the number of waves of the incident signal: $\alpha_s/C_o$, $C_o$ is the velocity of propagation of the incident elastic waves in the bulk of the elastic medium 9 in contact with the piezoelectric medium 11, and
$\alpha$ is the angle of incidence of the acoustic energy in relation to the main axis of the device for which the relationship $$kp \pm Ks \sin \phi = \pm \frac{2\pi}{p}$$

is satisfielld. This angle $\phi$ corresponds to the bearing direction in which the incident acoustic energy of pulsation $\alpha_s$ is propagated in the bulk of surrounding medium 9 for filtering in a band $\alpha_p + \alpha_s$ and for given propagation in an agreed direction at the surface of the piezoelectric medium 11. The above relationship may be written $$kp \pm ks \sin \phi = \frac{2\pi}{p}$$

which establishes an approximately linear relationship between $\phi$ and $\alpha_p$ for a small value of angle $\phi$, since $\alpha_p$ equals $C \times Kp$.

By the means of a staircase excitation with a step duration of $T=L/C$ there is obtained at the output of array 12 a complete amount of space representing the overall nonlinear interaction between the acoustic excitation wave of pulsation $\alpha_p$ and the bulk wave acoustic energy which is incident in a given direction $\phi$.

At time $t_1 = L/C$ after the beginning of excitation the acoustic energy received is therefore that coming from direction $\phi_1$, at time $t_2 = 2L/C$, the energy is read from $\phi_2$, and so on, the whole of the device being aimed in the same direction $\phi$ at the end of each step of duration $T$ in the excitation signal of pulsation $\alpha_s$.

FIG. 3b represents an excitation signal in which each step in the signal whose pulsation is $\alpha_p$ lasts for $0.25L/C$, because of the fact that the surface wave is propagated at a frequency of $\alpha_p$, the useful length $L$ of the device is thus physically occupied at the end of time $T = L/C$ by four different excitations, thus causing the four sections of the device affected by the excitations to be aimed in four different directions. At this time $t_1 = T$ the device supplies at the output of array 12, for the reasons given above, an electrical signal which results from the overall non-linear interaction between the acoustic wave of pulsation $\alpha_p$ and the incident energy of pulsation $\alpha_s$ which originates from a region of space defined by the intersection of the four paths corresponding to the angles $\phi_1, \phi_2, \phi_3, \phi_4$ which are imposed by the four steps of the excitation pulse namely $\alpha_{p1}, \alpha_{p2}, \alpha_{p3}, \alpha_{p4}$. In more simple terms, the device "accommodates" over a finite range equivalent to a focal depth.

FIG. 3c shows an excitation signal equivalent to a linear frequency modulation which is represented by a continuous inclined slope.

At the end of the period $T = L/C$ taken by the acoustic surface wave of pulsation $\alpha_p$ to become established under array 12, the continuous distribution of the excitation signal over the useful length $L$ of the device gives rise to a continuous alteration in the favoured directions of aiming $\phi_o$ appropriate to each point on the abscissa $x_o$, this amounting $t_o$ accommodation onto a focal point Po. This is true at time $t_o$; as time progresses the directions of aiming as a whole are changed, as also is their point of convergence, and as a first approximation point $P_o$ moves along part of a straight line parallel to the device 10. The device according to the invention has therefore in fact read a linear distribution of acoustic energy situated at a certain distance d from its receiving surface in a medium in which the incident energy in question is propagated in volume.

The greater the inclination of the slope formed by the excitation signal, and thus the faster the frequency of modulation, the greater will be the difference between angles $\phi_A$ and $\phi_B$ for example, which correspond to the direction of aiming at abscissa points $xA$ and $xB$ these representing the ends of the array 12 in the device shown in the diagram underneath FIG. 3C, and the shorter will be accommodation distance $d$.

The device according to the invention enables either real images to be read, which is the case in the foregoing description, and also virtual images as a result of inversion of the sign of the variation of the excitation signal. Its angular definition in its central plane may be made identical to its definition in the plane of aiming by means of a preliminary focusing by anamorphosis using a cylindrical acoustic lens the axis of which is parallel to the device, or by making the width of the interdigital comb 12 the same as its length L.

There is obtained in the vicinity of the main axis of the analyser device an approximately third order stigmatism.

The filtering of the output signal from array 12 is advantageously centered on the pulsation $\alpha_p + \alpha_s$ of this signal, for example, with a view to improving the signal to noise ratio of the useful signal in as narrow as possible a frequency band.

Figure 4:
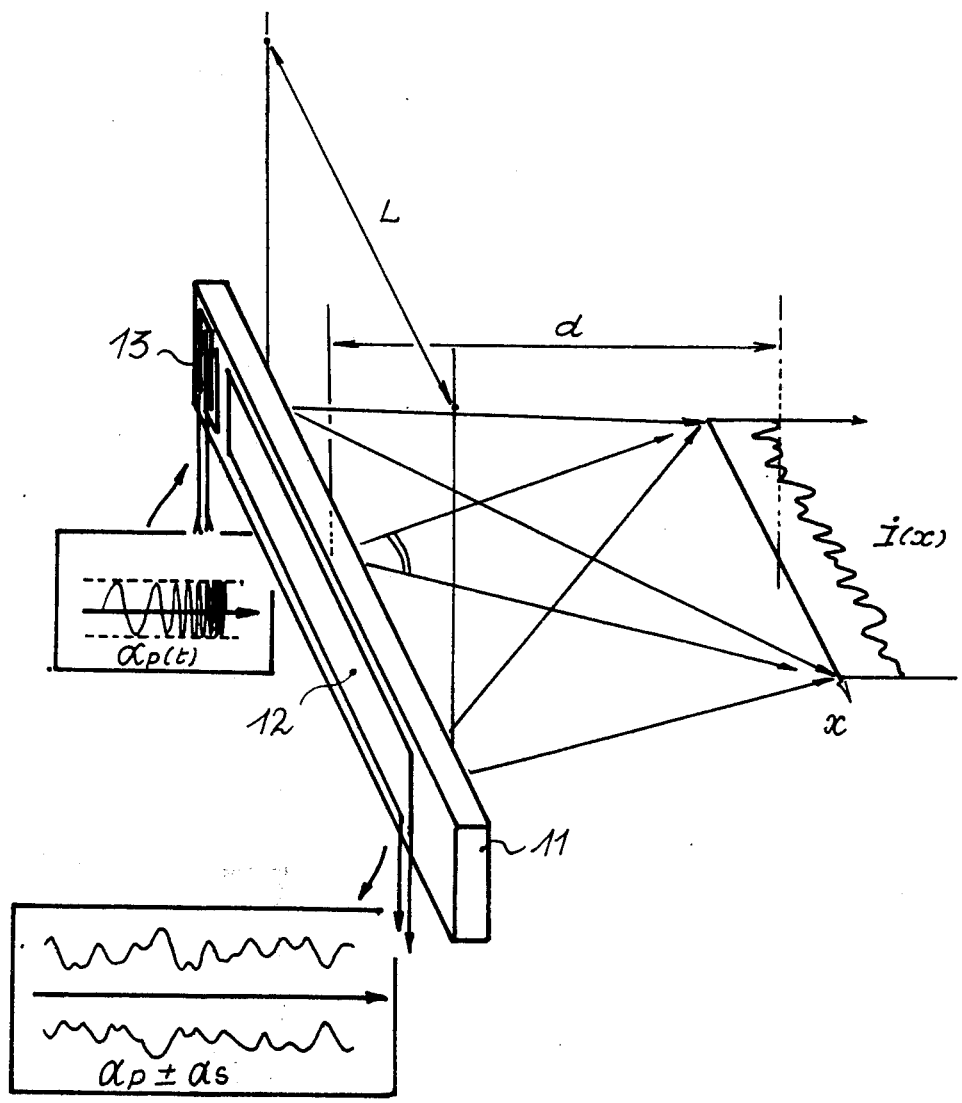
FIG. 4 shows a perspective view of the device according to the invention and illustrates other signals which will help in understanding the method of operation when the device is used accordingly.

FIG. 4 is a perspective view of the analyser device with a reminder of the signals used to operate it and of its geometrical components, in the case of this second type of operation. The structural modifications mentioned above are valid for both types of operation of which the device is capable.

What is claimed as new and desired to be secured by letters patent of the United States is:

1. A system for reading acoustic images propagated in an elastic medium, comprising:
    a surface acoustic wave analyser device for processing an incident signal by interaction with an excitation signal and for producing a resulting output signal convenient for imaging;
    a signal generator means for supplying said excitation signal having short pulses with a pulsation $\alpha_p$ kept at a first constant periodicity;
    an output display means for imaging;
    said analyzer device comprising a piezoelectric medium substrate having one face to meet said elastic medium for receiving incident acoustic bulk waves signal propagated at a second constant periodicity pulsation $\alpha_s$ and forming on said receiving face an acoustic image defined by a linear acoustic energy density,
    and further provided on the opposite face with at least one electro-acoustic transducer means connectable to said output analyser means and at least one interdigital array means of a given length (L) successively arranged on said substrate opposite face perpendicularly to the direction of propagation of a launced elastic surface wave and connectable to said generator means,
    and wherein said incident $\alpha_s$ and excitation $\alpha_p$ signals, simultaneously applied to said array each respectively generate a pattern of mechanical surface strains and the non linear interaction thus produced by the two said patterns gives rise to acoustic surface waves with resulting signal pulsation due to addition or difference of the superimposed pulsations $(\alpha_p \pm \alpha_s)$, the duration (T) of said resulting signal $(\alpha_p \pm \alpha_s)$ being equal to the ratio of said array length (L) to the propagation velocity (C) of the surface waves over the said substrate, and
    the acoustic image being derived from the electrical signal supplied by said transducer means to said output display means with a filtering around its constant resulting pulsation $(\alpha_p \pm \alpha_s)$.

2. A system comprising analyser device means according to claim 1 wherein said signal generator means is adjusted for providing excitation signal applied to said array means through the transducer means with a pulsation $(\alpha_p)$ adjusted to vary with time according to a linear law and having a duration which is greater than the ratio between the said interdigital array means length (L) and the propagation velocity (C) of the said acoustic surface waves over the said substrate,
    said linear pulsation variation with time of the excitation signal pulse $(\alpha_p)$ being adapted to a distance (d) separating said receiving face of the substrate and the relative position of the acoustic image,
    the resulting signal at the output of the said interdigital array means is applied to said output display means including a filtering around a pulsation resulting from the sum of difference of the incident and the excitation signal pulsations $(\alpha_p, \alpha_s)$ applied to the said array means and represents then the acoustic image in time.

3. A system according to claim 1 wherein the electro-acoustic transducer means of the said analyzer device is of interdigital type having the same periodicity (p) as that of the said interdigital array means,
    further wherein a semi-conductor member is disposed isolated by a thin dielectric film to overlap the said array means,
    and wherein the produced electrical interactions between the said semiconductor member, the piezoelectric medium substrate and the interdigital array means are second order non-linear means interactions.

4. A system according to claim 1 wherein the analyzer device comprises, in combination, the electro-acoustic transducer means, the interdigital array means arranged away from and along the propagation path of the acoustic surface waves on the surface of the said piezoelectric medium substrate, and further comprises,
    a semi-conductor member disposed isolated by a thin dielectric film to partly overlap the said array means
    and a group of mutually isolated conductive strips arranged perpendicularly to the said propagation path of the launched surface waves and which cover on the one hand the said propagation path and, on the other hand, the said semi-conductor member,
    these strips being isolated from the said semiconductor by a thin dielectric film and having a periodicity which is small in comparison with that of the said interdigital array, and wherein the electrical interactions between the said semiconductor member, the said piezoelectric medium and the said interdigital array are second order non-linear interactions.

5. A system according to claim 1, wherein said substrate used in the analyzer device comprises a material which is semiconductor as well as piezoelectric.

6. A system according to claim 2, wherein the said substrate used in the analyzer device comprises a material which is semiconducting as well as piezoelectric.

* * * * *